US00RE38543E1

(19) United States
(12) Reissued Patent
van Zijderveld

(10) Patent Number: US RE38,543 E
(45) Date of Reissued Patent: Jul. 6, 2004

(54) CHAIN FOR A CHAIN CONVEYOR, AND CONVEYING SYSTEM COMPRISING SUCH CHAIN

(75) Inventor: George Johannes van Zijderveld, 's-Gravenzande (NL)

(73) Assignee: Rexnord FlatTop Europe B.V., S-Gravenzande (NL)

(21) Appl. No.: 09/442,115

(22) Filed: Oct. 22, 1999

Related U.S. Patent Documents

Reissue of:
(64) Patent No.: 5,678,682
Issued: Oct. 21, 1997
Appl. No.: 08/525,478
Filed: Sep. 8, 1995

(30) Foreign Application Priority Data

Sep. 9, 1994 (NL) ..... 9401477

(51) Int. Cl.[7] ..... B65G 17/06
(52) U.S. Cl. ..... 198/853
(58) Field of Search ..... 198/852, 853

(56) References Cited

U.S. PATENT DOCUMENTS

| | | | | |
|---|---|---|---|---|
| 3,262,550 | A | 7/1966 | Kampfer | |
| 3,317,030 | A | 5/1967 | Davis | 198/853 X |
| 3,554,360 | A | 1/1971 | Blidsoe | 198/853 X |
| 3,669,247 | A | 6/1972 | Pulver | |
| 3,738,478 | A | 6/1973 | Tourtellotte | 198/853 X |
| 3,768,631 | A | 10/1973 | Wahren | 198/189 |
| 3,804,232 | A | 4/1974 | Friewald et al. | |
| 4,524,865 | A | 6/1985 | von Hofen | 198/852 |
| 4,821,869 | A | 4/1989 | Hodlewsky | |
| 4,880,107 | A | 11/1989 | Deal | |
| 5,042,648 | A | 8/1991 | Garvey | 198/853 |
| 5,176,247 | A | 1/1993 | Counter et al. | 198/853 X |
| 5,201,407 | A | 4/1993 | Proske | 198/853 X |
| 5,307,923 | A | 5/1994 | Damkjaer | 198/853 X |
| 5,678,682 | A | 10/1997 | van Zijderveld | |

FOREIGN PATENT DOCUMENTS

| | | | |
|---|---|---|---|
| EP | 286173 | 10/1988 | |
| FR | 2101049 | 3/1972 | B65G/17/00 |
| FR | 2208830 | 6/1974 | B65G/17/06 |
| FR | 2265640 | 10/1975 | B65G/17/08 |
| FR | 2380203 | 9/1978 | B65G/17/06 |
| FR | 2564810 | 11/1985 | B65G/17/38 |
| NL | 7708946 | 2/1979 | |

*Primary Examiner*—James R. Bidwell
(74) *Attorney, Agent, or Firm*—Quarles & Brady LLP

(57) ABSTRACT

A conveyor chain manufactured from plastic, which is adapted to move at higher speeds than has been conventional heretofore and which is consequently particularly suitable to be used in a conveying system together with a conveyor mat to take over products from this mat or feed them to it. The chain has as a specific property that the front edge and the rear edge of the bearing surface of the chain link are of curved, preferably elliptically-shaped design in the plane of the bearing surface, that the single hinge eye at the rear edge of the bearing surface has an upper surface which extends in the same plane as the bearing surface and which engages through a convexly shaped end in a correspondingly shaped recess in the bearing surface of the adjacent link coupled thereto through the hinge pin. By these measures the transition of products to and from the chain proceeds extremely smoothly at high speeds too.

17 Claims, 4 Drawing Sheets

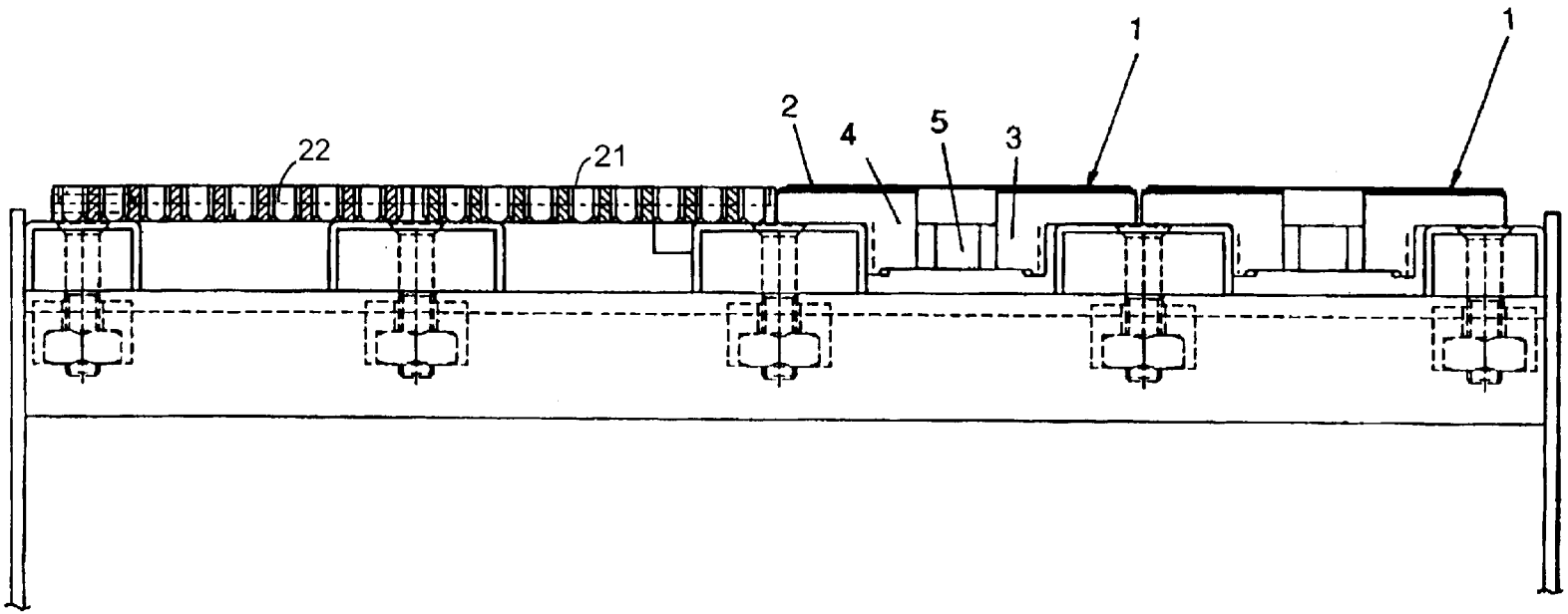
AMENDED
FIG. 8

CHAIN FOR A CHAIN CONVEYOR, AND CONVEYING SYSTEM COMPRISING SUCH CHAIN

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a chain for a chain conveyor, which chain consists of plastic links having a bearing surface and a connecting system situated under the bearing surface and including two spaced eyes on one side of the link, one eye situated between the spaced eyes on the opposite aide of the link, and a hinge pin pivotally interconnecting a pair of successive links, the hinge pin being embraced by the two spaced eyes associated with one of the links of the pair and the one eye situated between the spaced eyes associated with the other link of the pair, while the bearing surfaces, the hinge pins and the hinge eyes are designed so that the chain can bend not only about the hinge pins but also in the plane of transport formed by the bearing surfaces of the successive links, and at the underside of the bearing surfaces guide surfaces extend downwards perpendicularly to the plane of transport.

2. Background Art

Such a conveyor chain is known from NL-A-92.02058 and is used, for instance, in bottling plants and the like for conveying bottles along the various stations of a bottling line. The chain then moves over rails which are provided with guide means which cooperate with the guide surfaces provided at the underside of the chain to limit the lateral displacement of the chain. Such chains are also used to conveying cardboard boxes, cans, (beverage) tins and the like. Further, such chains find application wherever individual conveyance of products is desired.

Also known are conveyors where the objects to be conveyed are conveyed not by means of a chain but by means of a mat made up of modules. Such a conveyor mat is for instance disclosed in NL-A-92.01999 and can be used for conveying the same type of objects as that conveyed with chains.

There are also conveying systems that utilize mats as well as chains and which necessitate the conveyance of objects from a mat to a chain vice versa. In each such conveying systems consisting of mats and chains, there is a need to be able to use chains of the type described in EP-A-92.0,286,173. This publication describes a plastic conveyor chain of the type described is NL-A-92.02058, where the hinge pin coupling the links is made from a ferromagnetic material. In bends that are present in the conveyor track of the chain, the bearing surfaces of the links are prevented from going off the rails on which they move as a result of the pulling force exerted on the chain in the outer bend, by pulling the ferromagnetic hinge pin downwards by means of magnetic force. To that end, U-shaped bend segments are arranged in the bends, with magnets arranged between the rails in the bottom of the U. Such bend segments in which the chain is retained flat on the rails by means of magnetic force have major advantages over bend segments in which the chain is kept flat by means of so-called bevels, i.e. inclined guide surfaces provided at the underside of the bearing surfaces of the links, or so-called tabs, i.e. projections which cooperate with correspondingly shaped guide surfaces on the inside of the bend segment. These advantages include a lesser wear of that bend segment and the guide surfaces on the chain links, a lower noise production, the possibility for the chain to pass any contaminations that are present in the bend segment, such as fragments of glass, inasmuch as it can come clear of the track in vertical direction, and the possibility of speedily cleaning the bend segments because the chain can be lifted off the rails in the bend without any problems.

However, the use of a chain of the type described in EP-A-0,286,173 in combination with a conveyor mat of the type described, for instance, in NL-A-92.01999 is not possible without more, because the chain must then move at a considerably higher speed than the speed for which it has been designed and is then subject to excessive wear inter alia due to the increasing friction especially in the bend segments of the transport track which the chain traverses. The chain has to run at a high speed because when a chain is traveling next to a mat and is to take over products from the mat, in each case a number of products being conveyed in parallel orientation on the mat are to be conveyed on the chain in a line one behind the other. When, for instance, five cans which are being conveyed side by side on the mat are to be transferred to a single chain by means of guide rails, the chain must travel five times as fast as the mat. In addition, the transitions between the successive chain links cause problems in that transverse transfer of products from a mat to a chain, as for instance with an incliner, or from a chain to a mat.

SUMMARY OF THE INVENTION

The invention contemplates the provision of a conveyor chain which does not exhibit these drawbacks or does so at least to a considerably lesser extent, and which can be used in a simple and efficient manner together with conveyor mats in one conveying system, while in the bends of the track of the chain, by means of magnetic force, the chain can be held flat on the rails on which it moves.

To that end, that invention provides a conveyor chain of the above-mentioned type, in which the front edge and the rear edge of the bearing surface of the chain link are, respectively, convexly and concavely curved in the plane of the bearing surface, the single hinge eye a the rear edge of the bearing surface has an upper surface which extends in the same plane as the bearing surface and is provided with a convexly curved end, which hinge eye engages in a correspondingly shaped recess in the bearing surface of an adjacent link coupled thereto through the hinge pin, and the guide surfaces extend from essentially the front edge of the bearing surface to essentially that rear edge of the bearing surface.

By the features according to the invention, a conveyor chain is obtained in which the transition between two adjacent links exhibits a much smaller interspace than in the known chains, and in which, in particular owing to the curvature of the front edge and that rear edge of the bearing surface of each link, the transport of objects in lateral direction proceeds more smoothly, while further, when products accumulate on the chain, the chain slides under the products more easily. Owing to the guide surfaces having a maximum length because, unlike those used in known chain links, they extend from the front edge as far as the rear edge of the bearing surface of the links, the surface area thereof is maximal and as a result the wear due to the friction at high speeds can be reduced to an acceptable level.

To make the chain suitable in particular for conveying aluminum beverage cans, the bearing surface is provided, for instance in the manner known from NL-A-92.02058, with openings through which the $Al_2O_3$ released as a result of wear at the bottom of the cans can be discharged.

Preferably, also the front edge of the bearing surface, viewed in a direction perpendicular to that bearing surface. is rounded off, so that the smooth transition of products both in longitudinal and in transverse direction is further facilitated.

Further, it is preferred that the guide surfaces are not, as is usual, flat but are slightly concavely curved in the longitudinal direction of the chain link with a radius corresponding with that of the rails of the bend segment in which the chain links are to travel. As a result, the guide surfaces are in contact with the inside of the legs of the bend segment no longer solely along a vertical line of the guide surface but along the entire guide surface, so that wear is reduced.

In accordance with a further elaboration of the invention, for further facilitating the transition in transverse direction between a mat and a chain, the height of the bearing surface of each chain link is approx. 9 mm, which is at least twice the thickness of the bearing surfaces of the links of a conventional chain.

It is noted that NL-A-77.08946 discloses a conveyor chain consisting of chain links that is flexible in the plane of transport, where the single hinge eye of a chain link has an upper surface extending in the bearing surface of the link and comprises a convex end. These chain links, however, have a bearing surface with a rectilinear front edge and a rear edge consisting of two parts tapering obliquely to the single hinge eye. Further, the guide surfaces of the links only have a very small surface area, so that the known chain is entirely unsuitable for the purpose for which the present chain is intended.

Further. U.S. Pat. No. 4,524,865 discloses a conveyor chain which consists of chain links and is flexible in the plane of transport, where the front edge of the bearing surface is convex and the rear edge concave. For the rest, however, this chain is of an entirely different type, because the successive chain links are not connected by means of hinge pins but by means of a ball-and-socket construction. Accordingly, the chain is not suitable for that objective contemplated by the present invention and, owing in particular to the ball and socket joint, is relatively fragile and unsuitable for high speeds.

Finally, FR-A-2,208,830 discloses a conveyor chain which shows a great similarity to the chain according to the above-mentioned NL-A-92.02058, which chain, however, is provided with bevels, i.e. guide surfaces extending obliquely outwards relative to the bearing surface of the chain links, which can cooperate with corresponding obliquely extending side faces on the rails over which the chain runs and which serve to prevent the chain going off the rails in bends. This known chain contemplates accommodating the bending moments occurring in the lower part of the chain at a high tensile load by fitting additions plastic material in this lower part. This object is achieved by making the oblique guide surfaces additionally thick, viewed in the transverse direction of the link, and by making the single hinge eye of additionally heavy construction. The length and the height of the guide surfaces, however, are the same as with conventional plastic chains of the present type. Further, the chain links are also conventional in structure, so that the front edge of the bearing surface is rectilinear, and the rear edge consists of two portions extending obliquely towards the single hinge eye, while the end of the single hinge eye is also straight. Accordingly, at high speeds and in the case of lateral transport of products to the chain, this chain exhibits the same drawbacks as the chain according to NL-A-92.02058.

The invention further provides a conveying system consisting of at least one conveyor mat made up of modules and at least one conveyor chain according to claim 2, located next to this conveyor mat, which is guided over a track comprising at least one bend, in which bend a U-shaped bend segment is arranged, the top side of the legs of the U defining the rails over which the chafe moves, the inner surfaces of the legs of the U forming the guide means for the guide surfaces of the chain links, with magnets being arranged in the bottom of the U-shaped segment at least between the rails, characterized in that the height of the bearing surface of the chain links is essentially the same as the height of the modules of which the mat is made up and that the height of the guide surfaces is substantially equal to the height of the inside of the legs of the U-shaped bend segment.

BRIEF DESCRIPTION OF THE DRAWINGS

The invention will hereinafter be further explained on the basis of an exemplary embodiment with reference to the drawings. In the drawings:

*FIG. 8 is a side elevation view of a conveying system with a pair of chains disposed on parallel tracks next to a modular conveyor mat.*

DETAILED DESCRIPTION

Figure 1:
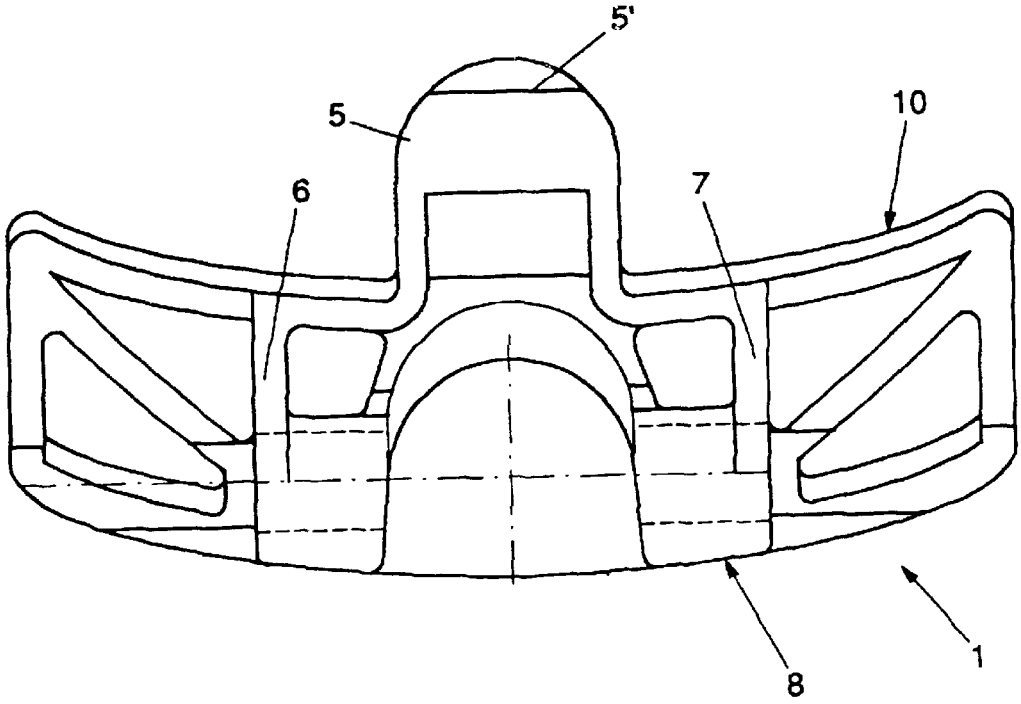
FIG. 1 is a bottom plan view of a chain link for the conveyor chain according to the invention.
Figure 2:
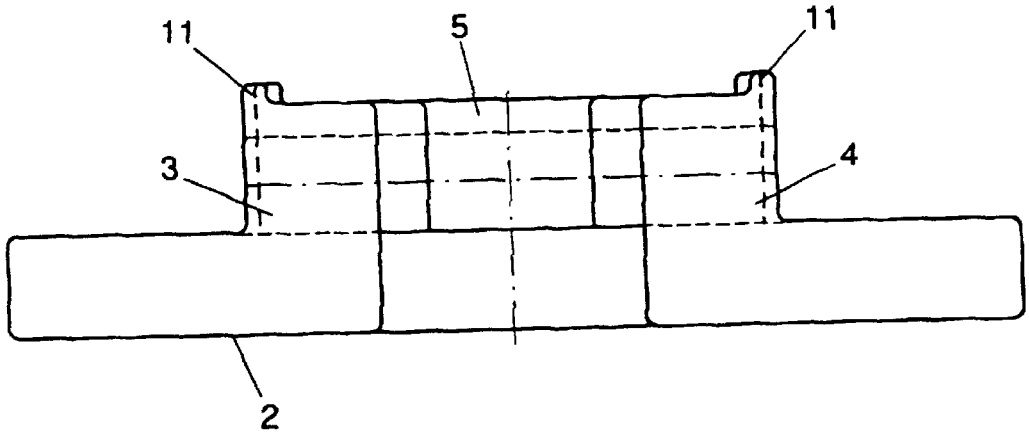
FIG. 2 is a side elevation of the chain link according to FIG. 1.
Figure 3:
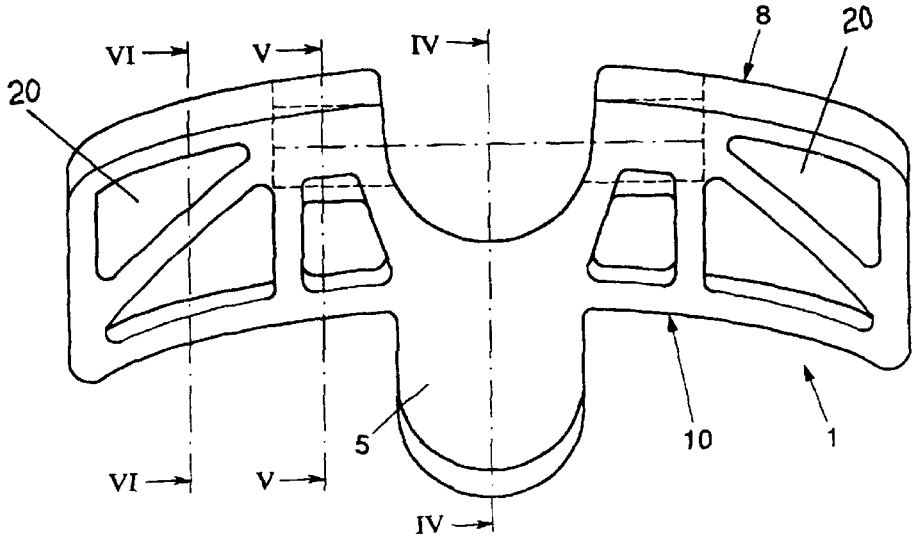
FIG. 3 is a top plan view of the chain link according to FIG. 1.
Figure 4:
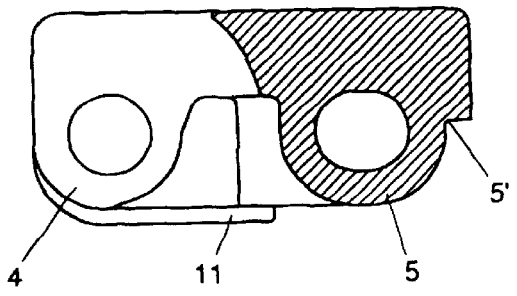
FIG. 4 is a section along the line IV—IV of FIG. 3.

The conveyor chain link 1 shown in FIGS. 1–6 comprises a bearing surface 2 with openings 20 and, viewed in the longitudinal direction of the chain, at the front two hinge eyes 3 and 4 and at the back a single hinge eye 5. Arranged between the hinge eyes 3 and 4 on the one hand and the hinge eye 5 on the other are stiffening ribs [6 and 7], which also form [the] guide surfaces *6 and 7* for the chain along the inside of the rails over which the chain moves. The hinge eyes 3 and 4 of a link are located on opposite sides of a single hinge eye 5 of the next link, the hinge eyes being connected to each other by a metal hinge pin, not shown. The chain links shown are of the type that forms a flexible chain which can also be advanced over a transport track that includes one or more bends.

In accordance with the invention, the bearing surface of each chain link is provided with a convexly curved front edge 8 and a concavely curved rear edge 10. According to the exemplary embodiment shown, the curves of the edges 8 and 10 follow the same elliptically-shaped curve, but a different curvature and, optionally, mutually slightly different curvatures are also possible. As is clearly shown in the drawings, the pair of hinge eyes 3 and 4 is located entirely under the bearing surface 2, so that the rear edge of the bearing surface of the adjacent, preceding link comes to lie as closely as possible to the front edge of the bearing surface of the link 1. In this manner, the possibility is realized of shifting products laterally to and from that conveyor chain without any disturbance at high speeds too. It can also be seen that the single hinge eye 5 has a convexly curved rear edge, with the hinge eye 5 engaging in a correspondingly shaped opening in the bearing surface 2 between the hinge eyes 3 and 4 at the front of a next adjacent link. Finally, the hinge eye 5 is provided with a flattened portion 5', which forms a surface of engagement for a tooth of a chain wheel by which the link 1 is driven when it is part of a conveyor chain.

Figure 5:
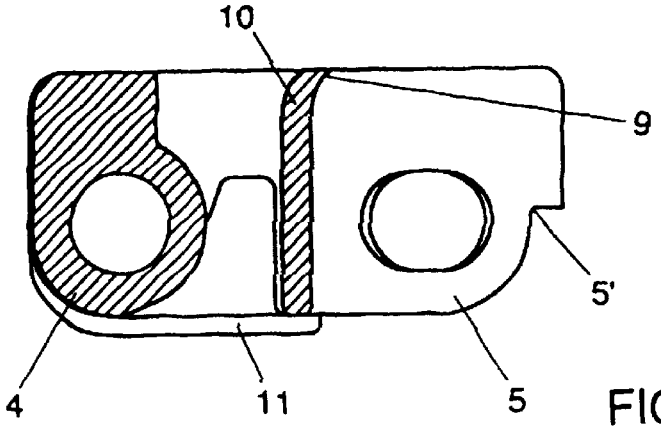
FIG. 5 is a section along the line V—V of FIG. 3.
Figure 6:
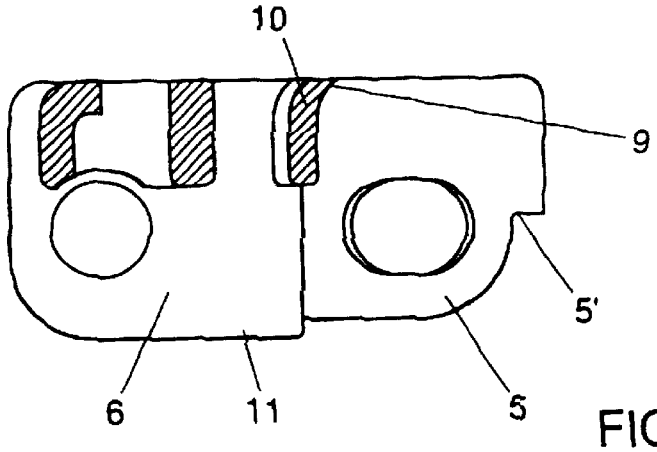
FIG. 6 is a section along the line VI—VI of FIG. 3; [and]

To provide the possibility that not only the chain links can be moved around a drive wheel—for which purpose it must be possible for the bearing surfaces of a link to tilt forward relative to the bearing surfaces of next adjacent links—but also the bearing surface can tilt slightly backwards, so-called backflexing, which makes it possible to lift the chain from the bend for inspection, the rear edge 16 of a link, in cross section, as can be seen in FIG. 5, has a rearwardly extending concavely curved upper edge portion 9, which serves to yet minimize the gap between adjacent links. In addition, the front edge 5, viewed in cross section, has a convexly rounded upper edge, which is provided for the same purpose and in addition promotes a smooth displacement of products to and from the chain.

As already observed, a chain which is used in a system together with a conveyor mat has to move considerably faster than has been conventional for chains heretofore. To prevent the plastic chain links, and in particular the guide surfaces thereof, from wearing too fast, these have a maximum length in the chain according to the invention, viz. essentially from that extreme front edge 5 to the rear edge 16, while the height too has been chosen to be maximal within the practically feasible limits. This last aspect is clearly visible in FIG. 7, which is a cross section of a bend segment of the type described in EP-A-0.286,173, with a U-shaped, plastic body 12 and a permanent magnet or magnets 13 arranged between the legs 15, 16 of the U-shaped body. On the top side of the legs 11 and 16 of the U-shaped body moves a chain consisting of the links 1 shown in FIGS. 1–6, interconnected by hinge pins 14 from a ferromagnetic material. These hinge pins are attracted by the magnets 13 and this prevents the chain from coming clear of the bend segment as a result of the pull expected thereon in the bend, in particular on the outside thereof, which is undesired because the chain may then run off the bend and/or products on the chain may fall over. In order to arrange for the attractive force of the magnets 13 on the hinge pins 14 to be sufficiently large to realize the attractions contemplated, the distance between these magnets and the hinge pins is preferably minimal, which means a minimum height of the legs 15 and 16 of the U-shaped segment. On the other hand, however, there is preferably space between the underside of the chain links 1 and the top of the bend segment between the legs 15 and 16 to enable the undisturbed passage of the chain over dirt and, for instance, fragments of glass deposed at that point. In order to provide the chain links with a guide surface having a maximum height dimension in contact with the upright inside of the legs 15 and 16, rib-shaped extensions 11 are provided at the underside of these guide surfaces, which extensions extend to within a very small distance from the portion of the bend segment between the legs 15 and 16, while between these extensions 11 the underside of the hinge eyes of the chain and any connecting ribs is located at a slightly greater distance from the bottom of the bend segment in order to enable contaminations to be passed. In this manner the guide surfaces have a maximum surface area, so that wear can be minor even at high speeds, while the advantages of the known bed with a distance between the underside of the chain and the bend segment are largely retained.

Because, viewed over the entire transport track, the greatest friction arises in the bend portion of the track, viz. between a guide surface and the inside of a leg of the bend segment, in accordance with the invention the guide surfaces 6 and 7, viewed in the direction in which the link 1 moves when it is part of a conveyor chain, are preferably slightly concavely curved. The guide surfaces then have a radius which is approximately equal to the radius of the inside surface of the legs of a bend segment in which the chain moves in use. Due to the large radius of the conventional bend segments, the curve of the guide surfaces is not visible in the drawings.

Figure 7:
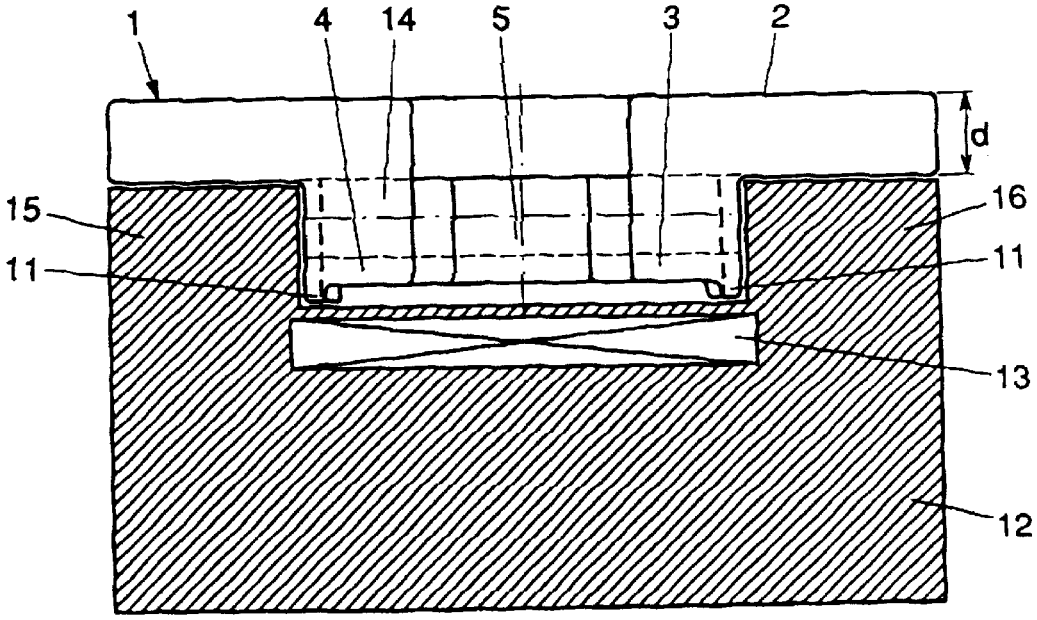
FIG. 7 is a cross section of a bend segment having therein a chain made up of chain links according to the invention[.]; *and*

FIG. 7 also shows that the height d of the bearing surfaces of the chain links is greater than in known chains. In particular, this height is approximately 9 mm, to enable a uniform transition from the upper side of the bearing surfaces to the upper side of adjacent chain mats.

*FIG. 8 shows a conveying system having two sets of chains and tracks one of which is adjacent a modular conveyor mat 21. The mat 21 includes a number of modules 22 positioned side by side to form a flat upper surface. The bearing surfaces 2 of the links 1 extend upwardly to a height essentially the same as the height of the modules 22 comprising the mat 21.*

It will be clear that within the framework of the invention, a large number of modifications are possible and that for instance the height of the bearing surface of the chain links can vary depending on the type of chain mat used.

I claim:

[1. A chain for a chain conveyor, which chain consists of plastic links having a bearing surface and a connecting system situated under the bearing surface and including two spaced eyes on one side of the link, one eye situated between the spaced eyes on the opposite side of the link, and a hinge pin pivotally interconnecting a pair of successive links, the hinge pin being embraced by the two spaced eyes associated with one of the links of the pair and the one eye, situated between the spaced eyes, associated with the other link of the pair, while the bearing surfaces, the hinge pins and the hinge eyes are designed so that the chain can bend not only about the hinge pins but also in the plane of transport formed by bearing surfaces of the successive links, and at the underside of the bearing surfaces guide surfaces extend downwards perpendicularly to the plane of transport characterized in that the front edge and the rear edge of the bearing surface of the chain link are, respectively, convexly and concavely saved in the plane of the bearing surface, that the single hinge eye at the rear edge of the bearing surface has an upper surface that extends in the same plane as the baring surface and is provided with a convexly curved end, which hinge eye engages in a correspondingly shaped recess in the bearing surface of the adjacent link coupled thereto through the hinge pin, and that the guide surfaces extend under the bearing surface essentially from the front edge to the rear edge.]

2. A chain [according to claim 1, characterized in that] *for a chain conveyor, which chain consists of plastic links having a bearing surface and a connecting system situated under the bearing surface and including two spaced eyes on one side of the link, one eye situated between the spaced eyes on the opposite side of the link, and a hinge pin pivotally*

*interconnecting a pair of successive links, the hinge pin being embraced by the two spaced eyes associated with one of the links of the pair and the one eye, situated between the spaced eyes, associated with the other link of the pair, while the bearing surfaces, the hinge pins and the hinge eyes are designed so that the chain can bend not only about the hinge pins but also in the plane of transport formed by bearing surfaces of the successive links, and at the underside of the bearing surfaces guide surfaces extend downwards to the plane of transport, characterized in that the front edge of the rear edge of the bearing surface of the chain link are, respectively, convexly and concavely curved in the plane of the bearing surface, that the single hinge eye at the rear edge of the bearing surface has an upper surface that extends in the same plane as the bearing surface, which hinge eye engages in a recess in the bearing surface of the adjacent link coupled thereto through the hinge pin, and that the guide surfaces extend under the bearing surface essentially from the front edge to the rear edge and* the guide surfaces are provided with rib-shaped extensions extending beyond the underside of the hinge eyes.

3. [A chain according to claim 1, characterized in that] *A chain for a chain conveyor, which chain consists of plastic links having a bearing surface and a connecting system situated under the bearing surface and including two spaced eyes on one side of the link, one eye situated between the spaced eyes on the opposite side of the link, and a hinge pin pivotally interconnecting a pair of successive links, the hinge pin being embraced by the two spaced eyes associated with one of the links of the pair and the one eye, situated between the spaced eyes, associated with the other link of the pair, while the bearing surfaces, the hinge pins and the hinge eyes are designed so that the chain can bend not only about the hinge pins but also in the plane of transport formed by bearing surfaces of the successive links, and at the underside of the bearing surfaces guide surfaces extend downwards to the plane of transport, characterized in that the front edge of the rear edge of the bearing surface of the chain link are, respectively, convexly and concavely curved in the plane of the bearing surface, that the single hinge eye at the rear edge of the bearing surface has an upper surface that extends in the same plane as the bearing surface, which hinge eye engages in a recess in the bearing surface of the adjacent link coupled thereto through the hinge pin, and that the guide surfaces extend under the bearing surface essentially from the front edge to the rear edge, wherein* the guide surfaces, viewed in the direction of travel of the chain, are concavely curved.

4. A chain according to claim [1] *2*, characterized in that the front edge and the rear edge are elliptically curved.

5. A chain link according to [1] *2*, characterized in that the rear edge of the bearing surface, viewed in a direction perpendicular to the bearing surface, has a rearwardly extending concavely curved edge portion.

6. A chain link according to claim [1] *2*, characterized in that the front edge of the bearing surface, viewed in a direction perpendicular to the bearing surface, is convexly rounded.

7. A chain according to claim [1] *2*, characterized in that the bearing surface is provided with openings.

8. A chain link according to claim [1] *2*, characterized in that the height of the bearing surface is approx. 9 mm.

9. A conveying system consisting of at last one conveyor mat made up of modules and at least one conveyor chain according to claim 2, located next to this conveyor mat, which is guided over a track comprising at last one bend, in which bend a U-shaped bend segment is arranged, the top side of the legs of the U-shaped segment defining the rails over which the chain moves, the inner surfaces of the legs of the U-shaped segment forming the guide means for the guide surfaces of the chain links, while in the bends of the U-shaped segment at least between the rails magnets are arranged, characterized in that the height of the bearing surface of the chain links is essentially the same as the height of the modules of which the mat is made up and that the height of the guide surfaces is substantially equal to the height of the inside of the legs of the U-shaped bend segment.

10. A conveying system [according to claim 9, characterized in that] *consisting of at least one conveyor mat made up of modules and at least one conveyor chain according to claim 2, located next to this conveyor mat, which is guided over a track comprising at least one bend, in which bend a U-shaped bend segment is arranged, the top side of the legs of the U-shaped segment defining the rails over which the chain moves, the inner surfaces of the legs of the U-shaped segment forming the guide means for the guide surfaces of the chain links, while in the bends of the U-shaped segment at least between the rails magnets are arranged, characterized in that the height of the bearing surface of the chain links is essentially the same as the height of the modules of which the mat is made up and that the height of the guide surfaces is substantially equal to the height of the inside of the legs of the U-shaped bend segment, wherein* the guide surfaces, viewed in the direction of travel of the chain, are concavely curved.

11. A conveying system comprising at least one conveyor mat having a plurality of modules of predefined height and at least one conveyor chain disposed adjacent the at least one conveyor mat and a track, the conveyor chain having a plurality of chain links having bearing surfaces and having guide surfaces of a predefined height, the track comprising at least one bend having a U-shaped segment having opposing legs provided with upper ends defining rails for supporting the chain and inner surfaces forming guides for the guide surfaces, the bearing surfaces of the chain links having a height substantially equal to the predefined height of the modules and the opposing legs of the U-shaped segment having a height substantially equal so as predefined height of the guide surfaces.

12. [The] *A* conveying system [in accordance with claim 11] *comprising at least one conveyor mat having a plurality of modules of predefined height and at least one conveyor chain disposed adjacent the at least one conveyor mat and a track, the conveyor chain having a plurality of chain links having bearing surfaces and having guide surfaces of a predefined height, the track comprising at least one bend having a U-shaped segment having opposing legs provided with upper ends defining rails for supporting the chain and inner surfaces forming guides for the guide surfaces, the bearing surfaces of the chain links having a height substantially equal to the predefined height of the modules and the opposing legs of the U-shaped segment having a height substantially equal to the predefined height of the guide surfaces* wherein the chain has a predefined direction of travel and wherein the guide surfaces, viewed in the direction of travel of the chain, are concavely curved.

13. A chain [in accordance with claim 2, characterized in that] *for a chain conveyor, which chain consists of plastic links having a bearing surface and a connecting system situated under the bearing surface and including two spaced eyes on one side of the link, one eye situated between the spaced eyes on the opposite side of the link, and a hinge pin pivotally interconnecting a pair of successive links, the*

*hinge pin being embraced by the two spaced eyes associated with one of the links of the pair and the one eye, situated between the spaced eyes, associated with the other link of the pair, while the bearing surfaces, the hinge pins and the hinge eyes are designed so that the chain can bend not only about the hinge pins but also in the plane of transport formed by bearing surfaces of the successive links, and at the underside of the bearing surfaces guide surfaces extend downwards to the plane of transport, characterized in that the front edge of the rear edge of the bearing surface of the chain link are, respectively, convexly and concavely curved in the plane of the bearing surface, that the single hinge eye at the rear edge of the bearing surface has an upper surface that extends in the same plane as the bearing surface, which hinge eye engages in a recess in the bearing surface of the adjacent link coupled thereto through the hinge pin, and that the guide surfaces extend under the bearing surface essentially from the front edge to the rear edge, wherein the guide surface are provided with rib-shaped extensions extending beyond the underside of the hinge eyes, and wherein* the guide surfaces, viewed in the direction of travel of the chain, are concavely curved.

14. A chain in accordance with claim 3 characterized in that the front edge and the rear edge are elliptically curved.

15. A chain in accordance with claim [4] *3*, characterized in that the rear edge of the bearing surface, viewed at a direction perpendicular to the bearing surface, has a rearwardly extending concavely curved edge portion.

16. A chain according to the claim [5] *3*, characterized in that the front edge of the bearing surface viewed in a direction perpendicular to the bearing surface is convexly rounded.

17. A chain according to claim [6] *3*, characterized in that the bearing surface is provided with openings.

18. A chain according to claim [7] *3*, characterized in that the height of the bearing surface is approximately 9 millimeters.

* * * * *

UNITED STATES PATENT AND TRADEMARK OFFICE

CERTIFICATE OF CORRECTION

PATENT NO. : RE 38,543 E
DATED : July 6, 2004
INVENTOR(S) : van Zijderveld

It is certified that error appears in the above-identified patent and that said Letters Patent is hereby corrected as shown below:

Column 1,
Line 17, “aide” should be -- side --.
Line 36, “to” should be -- in --.
Line 48, “In each such” should be -- In such --
Line 50, “92.0,286,173” should be -- 0,286,173 --
Line 58, “pin” should be -- pins --

Column 2,
Line 2, “that” should be -- the --
Line 26, “that transverse” should be -- the transverse --
Line 27, “incliner” should be -- inliner --
Line 39, “that invention” should be -- the invention --
Lines 50 and 56, “that rear” should be -- the rear --

Column 3,
Line 42, “that objective” should be -- the objective --
Lien 56, “additions” should be -- additional --

Column 4,
Line 10, “chafe” should be -- chain --

Column 5,
Line 4, “that conveyor” should be -- the conveyor --
Line 20, “16” should be -- 10 --
Line 24, “5” should be -- 8 --
Line 34, “that extreme” should be -- the extreme --
Line 34, “5” should be -- 8 --
Line 35, “16” should be -- 10 --
Lines 40-41, “the U-shaped” should be -- this U-shaped --
Line 41, “11” should be -- 15 --
Line 46, “expected” should be -- exerted --
Line 55, “preferably space” shodul be -- preferably some space --
Line 59, “deposed” should be -- disposed --

UNITED STATES PATENT AND TRADEMARK OFFICE

CERTIFICATE OF CORRECTION

PATENT NO. : RE 38,543 E
DATED : July 6, 2004
INVENTOR(S) : van Zijderveld

It is certified that error appears in the above-identified patent and that said Letters Patent is hereby corrected as shown below:

Column 6,
Line 5, 'bed" should be -- bend --
Line 8, "the track" should be -- that track --

Signed and Sealed this

Second Day of November, 2004

JON W. DUDAS
*Director of the United States Patent and Trademark Office*